United States Patent [19]

Noiret et al.

[11] Patent Number: 4,693,740
[45] Date of Patent: Sep. 15, 1987

[54] PROCESS AND DEVICE FOR MELTING, FINING AND HOMOGENIZING GLASS

[75] Inventors: Robert Noiret, La Ville; Michel Zortea, Chalon sur Saone, both of France

[73] Assignee: Saint-Gobain Vitrage, Courbevoie, France

[21] Appl. No.: 792,248

[22] Filed: Oct. 30, 1985

Related U.S. Application Data

[63] Continuation of Ser. No. 638,988, Aug. 9, 1984, abandoned.

[30] Foreign Application Priority Data

Aug. 9, 1983 [FR] France ............................. 83 13080

[51] Int. Cl.$^4$ .............................................. C03B 5/225
[52] U.S. Cl. ........................................ 65/135; 65/346; 65/347; 65/356; 65/DIG. 4
[58] Field of Search ........... 65/135, 347, 356, DIG. 4, 65/134, 346

[56] References Cited

U.S. PATENT DOCUMENTS

| 1,820,248 | 9/1928 | Raeder . | |
|---|---|---|---|
| 1,905,534 | 4/1933 | Wadman . | |
| 2,283,188 | 1/1941 | Cornelius . | |
| 2,990,438 | 6/1961 | Lambert et al. ................... | 65/347 X |
| 3,400,204 | 9/1968 | Gell . | |
| 3,942,968 | 3/1976 | Pieper ................................... | 65/134 |
| 4,012,218 | 3/1977 | Sorg et al. ............................. | 65/135 |
| 4,424,071 | 1/1984 | Steitz et al. ........................... | 65/337 |
| 4,426,217 | 1/1984 | Farrar et al. .......................... | 65/135 |

FOREIGN PATENT DOCUMENTS

| 2426297 | 11/1975 | Fed. Rep. of Germany . | |
| 2718653 | 11/1978 | Fed. Rep. of Germany ........ | 65/347 |
| 283567 | 8/1980 | Fed. Rep. of Germany . | |
| 1581242 | 8/1968 | France . | |
| 84401654 | 3/1984 | France . | |
| 8313080 | 6/1984 | France . | |

Primary Examiner—Robert L. Lindsay
Attorney, Agent, or Firm—Oblon, Fisher, Spivak, McClelland, & Maier

[57] ABSTRACT

Device for continuous manufacture of fined glass in which the flow of molten material is transferred from a melting compartment (1) to a fining compartment (2) by a submerged throat (8), the fining compartment (2) comprising a chute (14) carrying the material, in an overall ascending current, and delivering it to the conditioning station (3), in a surface current, heating means (16-19) distributed in the chute (14) bringing the material to the usual debubbling temperature.

This device is advantageously combined with a cupola type electric melting furnace, particularly for producing glasses with very volatile ingredients.

38 Claims, 4 Drawing Figures

PROCESS AND DEVICE FOR MELTING, FINING AND HOMOGENIZING GLASS

This application is a continuation of application Ser. No. 638,988, filed Aug. 9, 1984, now abandoned.

BACKGROUND OF THE INVENTION

This invention relates to the production, by a continuous production process, of molten glass exhibiting high-level fining and homogeneity qualities, such as the level meeting the requirements for making flat glass and more particularly float glass.

It relates to a process and an improved device for fining and homogenizing of molten glass, able to be applied after the melting of the vitrifiable mixture both by flames and electrically, but more especially suited to this latter case, because an electrically melted mixture benefits more from its advantages.

It also relates to a complete installation for producing fined and homogenized glass, in which the energy is essentially supplied electrically, thus meeting a very real need, resulting from the advantage, on the cost level, that electrical energy may be of nuclear origin over other energy sources, in particular, hydrocarbons.

Finally, it relates to the applications of this device, particularly for producing glasses from charges with very volatile ingredients whose losses it makes it possible to minimize and, consequently, to reduce both the cost of raw materials and pollution of the atmosphere.

Numerous devices for manufacture of molten glass by use of electric energy have already been proposed so far.

Some essentially proceed from an adaptation of flame furnaces and, for example, in a long tank, such as that of present industrial flame furnaces for flat glass, they provide a certain number of electrodes placed, as might be expected, to reproduce in said tank approximately the same convection currents that are found in said industrial flame furnaces, to make it possible to obtain the continuous progress of the various phases of the process for producing glass suitable for being delivered to a shaping device, namely, melting itself, fining, homogenizing and cooling down. These electric devices require a relatively complex and costly infrastructure, their energy efficiency is generally only on the same order as that of standard flame furnaces, and the shift of know-how in case of changing the scale of production capacity for a given type of installation, is often tricky.

The device described by the patent FR No.-A-2 261 233, for example, which comprises a long tank fed with vitrifiable materials at the upstream end and delivering molten glass at the downstream end suitable for use in a flat glass installation, is heated by a series of rows of vertical electrodes going through the bottom and placed crosswise to the length of the tank. The major convection currents used in this tank originate, as in flame furnaces of this type, in the hottest zone of the glass, or source point, localized by means of at least one, and preferably two, crosswise rows of vertical electrodes, which extend over practically the entire width of the tank to cause the ascending movement of a column of hotter glass, which spreads in two flows, on reaching the surface of the bath, to form two major ringlike thermal currents. The first flow, directed upstream, will lick the lower surface of the composition batch, be cooled, plunge toward the bottom and move downstream, in the lower part of the bath, to the source point, where it is picked up by the ascending current, thus forming a ringlike current, designated hereafter by the expression "melting belt."

The second major surface flow, directed downstream in the furnace, goes beyond the fining zone, the homogenizing and cooling zones, generally designated in the patent cited by the expression "conditioning zone," before reaching the evacuation station, where only a part of this current is removed, the rest returning to the source point, by the lower part of the bath, to be recycled there, thus constituting a second ringlike current, hereafter called the "homogenizing belt."

Said patent further indicates that, as observed in similar type flame furnaces, each of these two belts produces short circuits, i.e., some of the streams come back to the source point without having made the total travel described.

A drawback of furnaces of this type, whether flame or electric, resides in the risk of carrying materials directly from the composition batch to the evacuation station, without the various glassmaking processes being applied to them in a sufficiently complete manner.

Obviously, this risk is reduced by increasing the rate of recycling the material in each of the two major thermal belts but, on the other hand, the production energy cost is then increased. If one increases the homogenizing belt, for example, said recycling involves supplying, repeated at each cycle, of the amount of heat necessary to raise the temperature of the material from the temperature of the glass at the evacuation station, on the order of 1200° C., to the fining temperature, on the order of 1500° C. Now, the rate of recycling in this belt, equal to the ratio of the volumes of the return current and the draw, is usually at least on the order of 5, and often 10.

Besides the devices of this type, described above in a deliberately detailed way to show the phenomena observed in present tank furnaces and, at the same time, to define a vocabulary that is useful in the description of the present invention, there can be cited, as the prior art that can be taken into consideration in regard to the invention, devices comprising a partitioning of the tank, going even to assigning a particular compartment for each of the main operations to be used to provide glass of the desired quality.

Various patents, such as U.S. Pat. No. 1,820,248, FR Pat. No. 977 606, or GB Pat. No. 986 843, have thus proposed devices comprising a melting tank and a fining and conditioning tank, whose lower areas are connected to one another by a throat, and which are equipped with electrodes for heating by direct Joule effect through the molten glass. Although generally cooled, the throat can, however, also be heated electrically, optionally by an interconnection of the transformers feeding the two main compartments. These devices do not seem to have led to industrial developments meeting present needs in regard to fining, for reasons which, according to the teachings of the present invention, relate particularly to the insufficiency of confinement of the zone in which the fining is located and to convection phenomena.

Actually, it is known from these patents that the fining process extends both to the melting tank and to the conditioning tank.

An improvement in the control of the convection phenomena and confinement of the fining zone seems to be one of the aims of the U.S. Pat. No. 4,012,218, which proposes a device comprising a melting compartment, whose product is brought by overflow, by a surface current, to a fining compartment, where it receives an additional heating. The fined glass is separated by decanting, and is removed from the fining compartment at the bottom part. However, the quality of the fining is affected by the colder currents descending more rapidly along the walls than in the central region of the fining compartment. Further, obtaining of a homogeneous product that meets the standards contemplated by the invention is not described.

According to this same object of partitioning into compartments assigned to the main product operations, and especially to fining, the U.S. Pat. No. 2,733,111 provides, after a cell for melting vitrifiable materials, a fining cell, followed by a conditioning cell, the fining cell exhibiting the feature that the bath that it contains is kept constantly covered by an insulating foam layer whose upper skin is coagulated, thus forming a stable heat screen. This installation exhibits the drawback of not making it possible to attain fining and homogeneity levels corresponding to the requirements contemplated by the present invention. Actually, its fining cell, because of the arrangement of these various electrodes, some horizontal, some vertical, is a site of multiple thermal currents, which oppose one another and tend to make said cell function as a perfect mixer, leading to the delivery of a heterogeneous product in regard to length and conditions of treatment, i.e., the "thermal past," and, therefore, whose level of fining quality is limited. The semicircular shape of the conditioning cell does not lend itself well to creation of convection currents which, in the tank furnaces of the type described above, make it possible to deliver to the evacuation station a draw current consisting of glass protected from contact with the walls and bottom of refractory materials.

SUMMARY OF THE INVENTION

This invention aims at remedying the various drawbacks of the devices of this prior art and aims more particularly at minimizing the energy costs of the fining and homogenizing operations, while guaranteeing a high performance level in these operations.

This invention thus has as its object a device for producing fined glass by continuous manufacture, comprising successive particular compartments assigned respectively to the actual melting of a vitrifiable charge, then to fining of the resulting product, and further, optionally, to conditioning it, and in which the flow of molten material is transferred from the melting compartment to the fining compartment by a submerged throat, the fining compartment comprising a chute removing the molten material at the outlet of the submerged throat, carrying it in an overall ascending current and delivering it in a surface current to the following work station, generally assigned to conditioning before shaping and optionally substituting a particular compartment of the production device, said chute being provided with heating means making it possible to bring said surface current to a temperature on the order of the usual debubbling temperature.

In a device according to the invention intended more particularly for treating a vitrifiable material containing at least a fining agent, heating means have a heating capacity assuring, to the volume of production under consideration, an elevation of the temperature of the molten material going into the chute from a level below the decomposition temperature of the fining agent to a level at which said agent has a notable decomposition rate, said available capacity, for this purpose, preferably being able to impose a heating on the material of at least 100° C. during its travel along said chute.

Preferably, said heating means are distributed in the height of the chute to facilitate a homogeneous heating of the material and its overall ascending movement.

Advantageously, said heating means comprise a heating element dissipating energy, in a median horizontal zone close to the outlet of the throat, of the flow of material that escapes, to promote a drawing effect in the chute.

Preferably again, the heating means comprise elements dissipating a notable amount of energy at a rather slight distance from the upstream wall of the chute to make negligible there any descending current resulting from the cold wall effect, and thus promote, at the upper level of the glass in the chute, the formation, from said upstream wall, of the surface current directed downstream.

A preferred structure of the chute is in the shape of a hopper flared upward, i.e., whose section increased upward, advantageously comprising on the downstream side a plane inclined wall to work mainly with this flaring, by an inclination preferably between 50° and 80°.

Thus, the other walls constituting the hopper, for example, an upstream wall and the two sidewalls, will be generally vertical, the two sidewalls then being parallel to the plane of symmetry of the tank, and the upstream wall orthogonal to this plane. This structure is of easy design and use and facilitates the ascending movement, then the surface current of the flow of molten material downstream.

Said heating means advantageously consist of electrodes submerged in the bath, producing a heat release by direct Joule effect, through the bath itself. Preferably, said electrodes, are placed horizontally, parallel to the upstream and downstream walls of said hopper, their active part advantageously extending from one sidewall to the other of the tank, to promote homogeneity of the final heating of the glass flow. Vertical electrodes, going through the bottom can also be provided mainly or additionally in case of very large furnaces, to reinforcing the overall ascending movement, and also horizontal electrodes going through the downstream wall can be provided.

To assure the drawing effect of the chute of the fining compartment, the section of the output of the submerged throat advantageously exhibits a value less than that of the section of the lower part of the chute, and this latter exhibits a value at least equal to 30% of the section of the upper part, the depth of said chute being at least on the order of the square root of the area of the section of said upper part.

According to another advantageous characteristic of the device of the invention, the connection between the fining compartment and the following work station, which can advantageously be a conditioning and homogenizing compartment, exhibits a section of a value intermediate between those of the lower and upper sections of the hopper, and preferably comprises a spread corresponding to an increase of the passage offered to the glass flow at least equal to 20%, the sidewalls of the spread forming an angle less than 60° with the walls of the compartments that it connects, thus avoiding dead angles prejudicial to the flowing of the molten glass flow.

The conditioning compartment thus provided by the invention in combination with the fining compartment is advantageously in the form of a channel of approximately rectangular section, of a length at least equal to three times its width. Its average depth will advantageously be between 0.4 and 0.8 m, and preferably 0.5 and 0.7 m. For example, a depth of 0.6 m will advantageously be adapted for a channel 2 m wide suitable for a draw of 120 to 150 t/day, to set up a return current with a volume close to that of the draw current, i.e., a recirculation rate of 1.

The bottom of said channel can advantageously comprise a slope rising from upstream to downstream, the depth of the glass at each end, however, advantageously remaining in the limits fixed by the average depth.

The section offered by the evacuation orifice for removal of the glass for shaping it advantageously represents 30 to 50% of the section of the downstream end of the conditioning channel.

The bottom of said channel is advantageously limited upstream in relation to the fining hopper, and especially in the absence of a connecting spread between these two compartments, by a refractory sill submerged in the glass bath, reducing the passage section of the glass by a value generally between 20 and 60% in relation top the maximum section offered to the bath in the conditioning compartment.

Further, an atmosphere partition is advantageously provided between the two compartments, for example, by means of a mobile refractory screen able to be lowered to the vicinity of the bath surface.

Upstream from this screen, burners can advantageously be provided, mainly making it possible to maintain the atmosphere of the fining compartment in slight excess pressure to avoid any entry of cold air, and an additional useful thermal input, for example, in case of a failure in the electric heating conduit, replacement of electrodes, etc. Burners are also preferably provided in the conditioning compartment.

The conditioning channel can further advantageously be provided with agitators, preferably, in its upstream half, thus making it possible to reduce the length of said channel and to increase the draw and/or the homogeneity of the resulting glass.

According to an advantageous embodiment of the device of the invention, the compartment for melting the vitrifiable materials, intended to prepare a molten glass suitable for being treated in the following compartments, which have just been described, will comprise an electrically heated, cupola type tank.

This tank will generally be rectangular, with a depth on the order of 1 to 1.5 meters, the electrodes being placed in a manner known in the art, for example, going through the bottom.

The vitrifiable mixture is distributed by a suitable distributor, for example, of the type described by French patent application No. 81 16617, over the entire surface of the tank, and melting is performed with "covered crown" or "cold crown," i.e., under a continuous layer of vitrifiable material, removal of the molten glass being preferably performed by an orifice made at the bottom.

Said continuous layer acts as a thermal screen and further makes it possible to reduce pollution by retaining a large proportion of the volatile ingredients possibly present in the charge, such as selenium, boron, etc.

This invention also has as its object a process for production of fined glass by continuous manufacture, comprising a phase of melting the vitrifiable charge to form a bath of a molten mass in a melting zone, then a fining phase comprising a heating of the molten mass to a temperature making its debubbling possible, according to which the molten mass is carried under a considerable hydrostatic pressure from the melting zone to the fining zone, then is gradually brought, in a continuous flow traveling through said fining zone, to a slight hydrostatic pressure, in an approximately vertical ascending movement, from the lower part of the bath to its surface, said flow then being deflected in a surface current in the direction of a station for removal of the fined glass, the temperature of said surface current being, at its origin, at least equal to the usual debubbling temperature, preferably corresponding, generally, to a viscosity of 50 poises at most.

According to an embodiment of the process especially applicable to a vitrifiable charge containing at least a fining agent, said heating of the molten mass, during its travel from the fining zone is preferably performed from a level below the decomposition temperature of the fining agent to a level at which said fining agent exhibits a very notable decomposition rate.

For example, to make silica-soda-lime glasses such as the usual industrial glasses containing 68 to 74% $SiO_2$, 0 to 3% $Al_2O_3$, 12 to 15% $Na_2O$, 8 to 12% CaO, the vitrifiable charge bringing these elements advantageously contains sulfates in an amount corresponding to about 0.3 to 0.5% and more generally at least 0.1% $SO_3$, and heating of the molten mass during its travel through the fining zone covers preferably at least the temperature range between 1370° and 1480°. For this purpose, the molten mass escaping from the melting zone optionally undergoes a cooling during its transfer along the submerged throat to the fining zone to lower its temperature below the value constituting the lower limit of the range defined above.

Preferably, heating of the molten mass takes place for the most part during its overall rising movement.

Advantageously, said heating of the molten mass is initiated at its intake into the fining zone, in a median horizontal zone of said flow.

Preferably, removal of the glass, performed by the surface current coming from the fining zone, feeds a conditioning zone in which the glass is homogenized by a recirculation belt and cooled to temperature favorable to shaping, generally corresponding to a viscosity on the order of 1000 poises.

In an advantageous embodiment of the process of the invention, heating between said temperatures is obtained by direct Joule effect through the molten material to be fined, between electrodes submerged in it.

Also advantageously, said flow exhibits a slower ascending speed in the upper part of the fining zone than in the lower part.

Advantageously, the flow of material assuring the horizontal connection between the fining zone and the conditioning zone is carried at a speed greater than the speed of said flow during its ascending movement, then is slowed down at least 20% at its entry into the conditioning zone.

Preferably, the atmosphere lying above the glass above the fining zone is isolated by a partition from the atmosphere that prevails above the conditioning zone, an excess pressure being further created in the fining zone by means of flue gas coming from burners.

According to an advantageous characteristic of the process of the invention, the convection currents prevailing in the conditioning zone consist mainly of a surface current directed downstream, i.e., the evacuation post of the glass suitable for shaping, and of a bottom current directed upstream, or recirculation current, said recirculation current representing 0.5 to 3 times the volume of the draw and preferably on the order of 1 times the draw, the draw current preferably coming from the central surface part of the surface current.

According to the invention, the molten glass subjected to fining is preferably produced by electric melting under cold crown, i.e., consisting of the vitrifiable mixture to be melted, the removal being performed by the lower part of the bath.

Finally, the invention has as its object application of said device and process, particularly for making glasses containing considerable proportions of ingredients with strong vapor tensions.

Of the reactions of the molten glass that lead to release of gas, there will be essentially used in the cupola furnace decarbonizing reactions that require only temperatures below 1200° C., while those that correspond to the decomposition of the fining agents will preferably be only secondary, by limiting local overheatings of the molten mass thanks to a suitable choice of the number, dimensions and arrangement of the electrodes.

The glass leaving this cupola cell exhibits a degree of fining corresponding to a number of bubbles of more than 30 microns in diameter generally between 2500 and 7500, optionally even on the order of 250, per $dm^3$ of glass, the quality of fining moreover being difficult to control by means of temperature, and therefore of the single injected power, but rather thanks to an adjustment of the vitrifiable mixture. In any case, this quality is unsuitable for making float glass which requires a minimal rate of 2 to 3 bubbles per $dm^3$. The fining cell, optionally combined with a conditioning cell, such as proposed by the invention, therefore very advantageously rounds out this melting cell, particularly with regard to controlling fining and the cost of fining agents to be introduced into the charge.

If the quality requirements in fining material is less, for example corresponding to about 125 bubbles per $dm^3$ of glass, for example, to produce very fine bottles, the working can be less thorough in the melting furnace, allowing a notable saving of energy and wear of the refractories of the cupola furnace, the fining cell, and optionally the conditioning cell, very reliably performing all the functions normally assigned to them.

An installation for producing glass by electric heating of three compartments of melting, fining and conditioning, as described above, exhibits several advantages in comparison with traditional installations resulting from the reduction of scale which it makes possible (a rate of about 1/10 for the bottom surface). Its inertia, in particular, is very slight since response times could be observed, i.e., the periods for obtaining 90% of final response to a permanent modification of a datum relating to the charge, for example, on the order of 10 to 12 hours for this type of installation in comparison with 8 to 10 days for traditional flame furnaces producing glass suitable for floating.

This results in a greatly improved operational flexibility and in considerable savings in investments and utilization. The tint changes, for example, can be made much more quickly. Control of the oxidation-reduction of the atmosphere, moreover, is greatly facilitated, as is the control of the escape and losses of volatile materials, which especially makes it possible to apply the invention in a particularly advantageous way to production of selenium colored glasses, for example.

Moreover, experience has shown that a good homogeneity of the body of the molten glass, reflected by a uniform stratification of the glass sheet formed by rolling or floating from this body, could be obtained with a recirculation rate in the downstream belt on the order of 0.5 to 3, i.e., a volume of the return current of 0.5 to 3 times the volume of the draw and, in a particularly stable way, on the order of 1, consequently a very economical operation in regard to energy expenditure.

Under these conditions, the actual fining compartment can have rather small dimensions so that the average time of transit of the glass between the output of the submerged throat and the atmosphere screen marking the end of the hot zone can be reduced to a value on the order of 30 minutes.

The specific draw, in relation to the total surface of the bottom of the installation, can thus currently reach 3 to 5 tons/$m^2$/day.

BRIEF DESCRIPTION OF THE DRAWINGS

The device according to the invention and its mode of operation will now be described by way of nonlimiting examples with reference to the drawings in which.

DETAILED DESCRIPTION OF THE PREFERRED EMBODIMENTS

Figure 1:
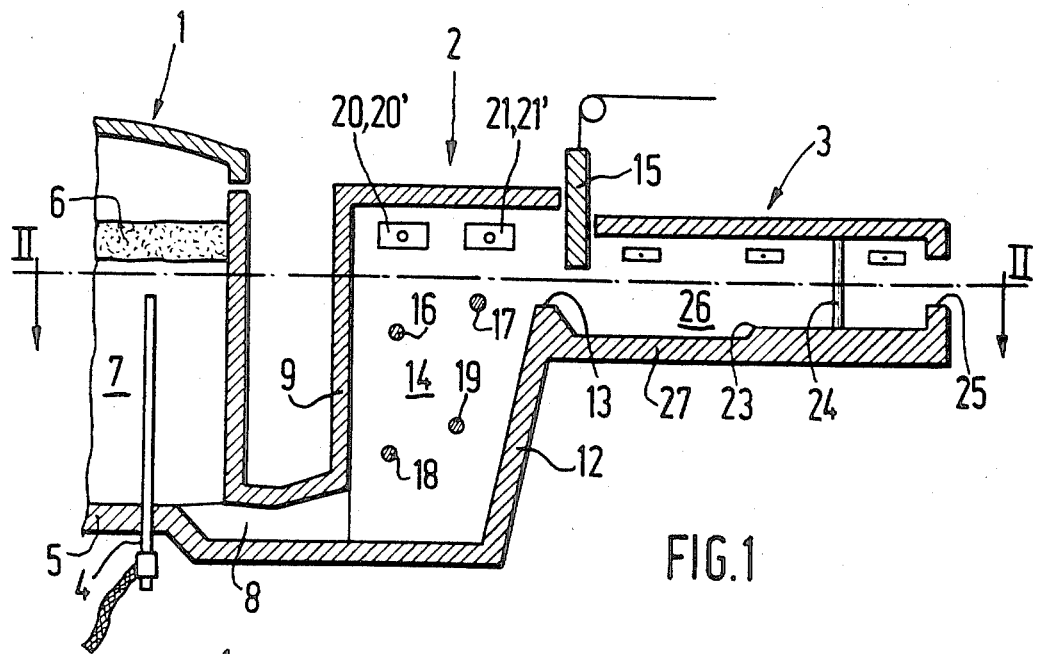
FIG. 1 is an elevation view, in section along I—I' of FIG. 2, of a device according to the invention.
Figure 2:
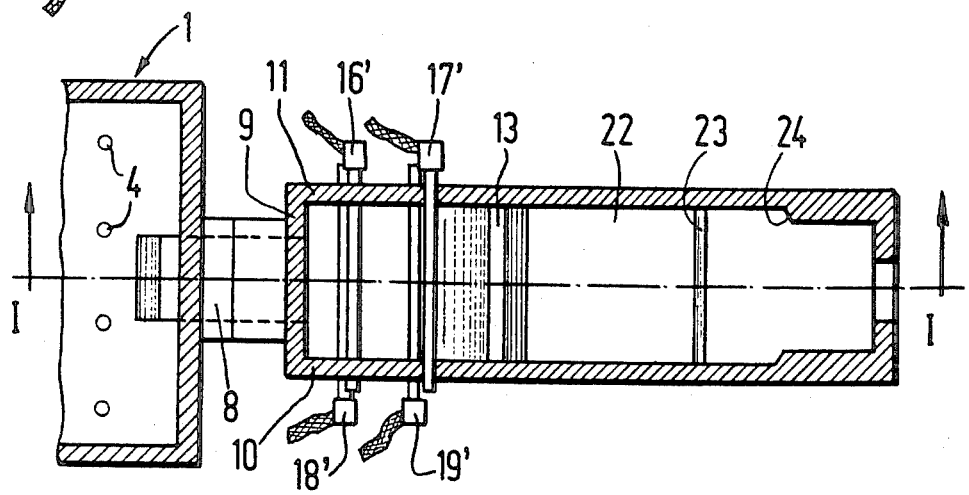
FIG. 2 is a plan view, in section along II—II' of FIG. 1, of this same device.

FIGS. 1 and 2 show diagrammatically, in section through the vertical plane of symmetry of the installation, and through the horizontal plane corresponding approximately to the upper level of the glass bath in the fining and conditioning compartments respectively, a device using electric energy to perform the various operations of melting, fining and conditioning of glass, in chambers or compartments corresponding respectively to reference numerals 1, 2 and 3.

The actual melting furnace 1 corresponds to the type known as a cupola furnace. It is heated by submerged vertical electrodes 4 going through bottom 5, and fed by a distributor, not shown, distributing vitrifiable mixture 6 over the entire surface of molten material 7.

Cupola furnace 1 supplies fining compartment 2 with molten glass by submerged throat 8 which removes the molten material decanted on bottom 5 of cupola 1. Throat 8 advantageously includes a divergent part opening on the lower part of fining compartment 2. The fining compartment 2 exhibits a structure having a general hopper or funnel shape, whose section is larger at its upper part than at its base, where throat 8 comes out. In the embodiment shown by FIGS. 1 and 2, upstream wall 9, sidewalls 10 and 11, all three vertical, and downstream wall 12, inclined downstream by an angle on the order of 70° in relation to the horizontal, constitute, with sill 13, the actual fining tank 14, said sill 13 in practice delimiting, in regard to the glass bath, the hottest zone of the furnace, aiming at fining of the glass, as compared to the downstream zone aiming at conditioning it. A suspended mobile screen 15 constitutes a similar delimitation for the atmosphere between the two compartments 2 and 3.

Compartment 2 is heated by a set of four electrodes 16, 17, 18, 19 going through tank 14 from one wall to the other. Current lead-ins 16', 17', 18', 19' to the electrodes are shown distributed on both sides of walls 10 and 11, but it is desirable, for fining compartment widths greater than 1 m, for example, to adopt parallel feeding of each of the two ends of each electrode, each of said electrodes being able, moreover, to consist of two halves placed opposite one another through walls 10 and 11.

Fining compartment 2 advantageously has an additional heating mode in the form of two groups of two burners 20-20', 21-21', each placed in one of walls 10 and 11 to be used particularly during firing up of the cell and during replacement of an electrode to assure a slight excess pressure opposing any entry of outside cold air.

Conditioning compartment 3 also has a certain number of similar burners distributed in its sidewalls, making possible the control of the temperature along channel 22, which has a step 23, a narrowing of width 24, and a removal orifice 25 for the glass to be delivered to shaping.

By way of illustration, there are given below the operating conditions of an installation according to the invention provided for a daily production on the order of 4 t/day of glass suitable for shaping, of very good fining quality.

The main dimensions and parameters of the device according to the above description, comprising a melting furnace 1, throat 8, fining cell 2 and conditioning channel 3 are given below:

|  | Melting (1) | Throat (8) | Fining (2) | Condition (3) |
| --- | --- | --- | --- | --- |
| Length (m) | 1.2 | 0.5 | 0.4 (low) 0.7 (high) | 4 |
| Width (m) | 1.0 | 0.4 | 0.5 | 0.5 |
| Height of glass (m) | 0.75 | 0.10 (input) 0.08 (reduct.) 0.15 (output) | 0.85 | 0.2 |

Sill 13, representing the downstream end of the fining compartment, is submerged under a thickness of glass of about 0.10 m, which leaves the surface current a passage section of 0.05 m².

The molybdenum electrodes of fining tank 14, four in number and 40 mm in diameter, submerged in the molten glass over a length of 0.5 m, according to an alternate arrangement of the type shown in FIG. 1, according to the data given below, are fed three-phase current, preferably by adopting the same phase for the two electrodes 16 and 18, and the two other phases for electrodes 17 and 19.

The position of the electrodes is defined in the following table by its height in relation to the horizontal bottom of compartment 2 (ordinate) and its distance in relation to upstream vertical wall 9 (abscissa).

| Electrodes | 16 | 17 | 18 | 19 |
| --- | --- | --- | --- | --- |
| Abscissa | 0.15 | 0.50 | 0.12 | 0.36 |

| Electrodes | 16 | 17 | 18 | 19 |
| --- | --- | --- | --- | --- |
| Ordinate | 0.70 | 0.75 | 0.25 | 0.30 |

The glass used exhibits the following composition (by weight):

| | |
| --- | --- |
| $SiO_2$ | 71.2% |
| $Al_2O_3 + TiO_2$ | 1.04% |
| $Fe_2O_3$ (total iron) | 0.08% |
| CaO | 9.18% |
| MgO | 4.49% |
| $Na_2O$ | 13.3% |
| $K_2O$ | 0.46% | the vitrifiable mixture consisting of the usual materials for making glass and comprising 20% cullet and 0.14% sodium sulfate in relation to the weight of the glass to be melted, with a moisture level of 2%.

Some values of the viscosity of this glass as a function of the temperature are indicated below, in log $\eta$ ($\eta$ in poises):

| T (°C.) | 997 | 1106 | 1202 | 1304 | 1407 |
| --- | --- | --- | --- | --- | --- |
| log $\eta$ | 4.16 | 3.41 | 2.89 | 2.43 | 2.07 |

To show the effectiveness of the fining cell, a comparison was made between two sets of operating conditions, the two were conducted with the same draw of 4 tons of glass per day, and the same power dissipated in melting cupola 1, the first operating condition corresponding, for fining compartment 2, to simply keeping the temperature of the glass taken from cupola 1 at about 1350° C., and producing a glass of a quality suitable for fine bottles (125 bubbles/dm³ of glass), the second operating condition, corresponding to an additional energy input in the fining compartment and bringing the glass there to 1500° C. and producing a glass of a fining quality meeting the standards for making float glass (less than 2.5 bubbles/dm³).

In practice, the glass first lost about 50° C. along throat 8, then it was brought, during its passage through the fining compartment, under the first operating condition, to 1360° C. for a dissipated power of 40 kW (with an average current density on the electrodes of 0.82 A/cm²), and under the second operating condition to 1510° C. for a dissipated power of 61.5 kW (with an average current density on the electrodes of 1.23 A/cm²).

The distribution of the current to the various electrodes of the fining compartment, under the conditions corresponding to the second operating condition, was made approximately in the following way:

| Electrodes (reference) | 16 | 18 | 17 | 19 |
| --- | --- | --- | --- | --- |
| Intensities (A) | 460 | 500 | 650 | 710 | corresponding to a total power of 61.5 kW and an impedence (Z) of 0.102 ohms.

It is found that a rather modest addition of energy, of about 0.12 kWh/kg of glass, suffices to cause very considerable advance in the fining quality.

There are further noted, although the depth of 0.2 m of the conditioning channel allows only a slight recirculation rate, a good quality of homogeneity, very much superior to that usually required for making luxury bottles, and slight corrosion levels after analysis of the resulting glass (Mo 0.0032%, $ZrO_2$ 0.066%).

Figure 3:
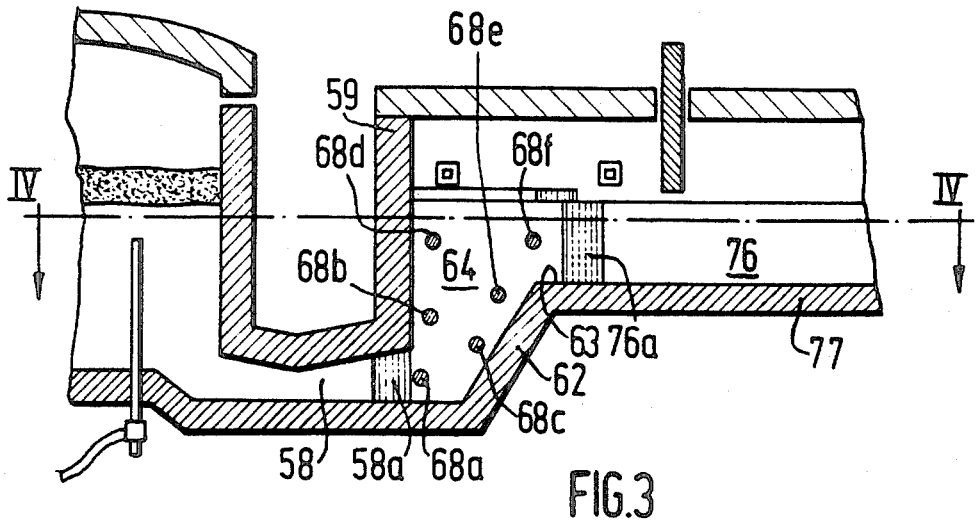
FIGS. 3 and 4 are views similar, respectively, to FIGS. 1 and 2, exhibiting structure characteristics better suited to a device on a larger scale than that of FIGS. 1 and 2, making possible daily productions on the order of a hundred tons.
Figure 4:
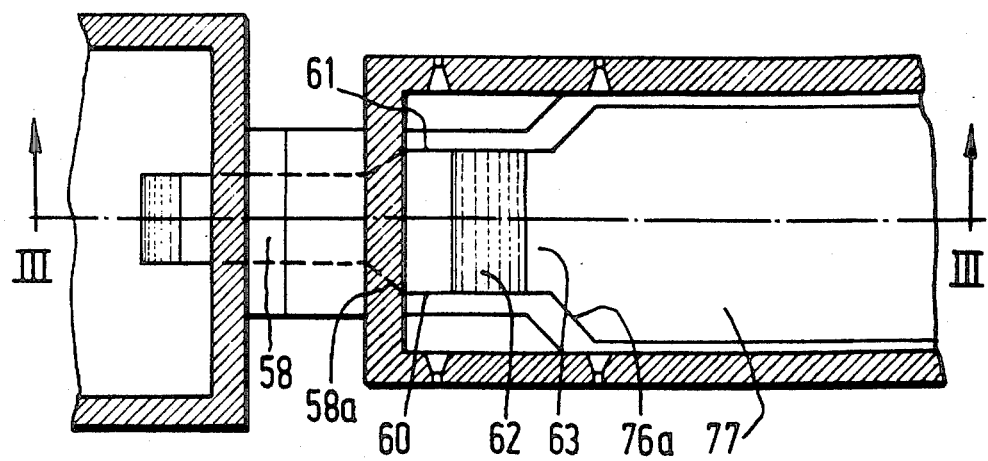

The device shown by FIGS. 3 and 4 corresponds to an installation with a much larger daily production than that of FIGS. 1 and 2, namely 120 to 150 t/day, depending on the quality contemplated for the delivered product.

It comprises approximately the same main elements as the device described in the first embodiment, and therefore attention will be given to its most striking structure characteristics.

It will be noted first of all that this structure aims at reducing as much as possible the dead angles that could disturb the flowing of the glass: throat 58 at about 0.8 m wide comprises at its outlet into hopper 64, through its upstream wall 59, a spread 58a bringing its width to equality with that of said hopper, of 1.2 m between sidewalls 60 and 61 and, similarly, connection 63 between hopper 64 and channel 76 is made by a new spread 76a, bringing to 2 m the width available for flowing of the fined glass flow in conditioning channel 76, whose bottom 77 comprises a slope rising downstream, by about 2 cm/m.

The downstream part of this spread 76a corresponds approximately to the limit of the hottest zone of the furnace, aiming at fining of the glass.

In regard to the number and arrangement of electrodes 68a-68f, it is noted that they, not shown in FIG. 4 to avoid overloading it, are distributed so as to affect the various streams of the ascending current which goes through hopper 64 and, at the same time, to distribute the thermal input over almost the entire height of the glass, which amounts to 1.6 m, in the hopper: this is thus aimed at controlling the movement and temperature of said streams and particularly to avoid any notable return current.

It is noted in this regard that this thermal input is initiated by electrode 68a, located approximately in the median zone of the flow of molten material escaping from throat 58.

The dimensions of this installation are greatly reduced in comparison with those of a traditional installation. In the present case, the total surface of the set of two fining and conditioning compartments does not amount to 20 m², whereas it is on the order of 200 m² in a standard furnace of the same production capacity.

The recirculation current, for a preferred average depth of 0.6 m of conditioning compartment 76, is preferably set at about 1 times or even lowered to 0.5 times the draw current, while maintaining a quality of homogeneity compatible with the production of float glass.

Agitators can advantageously be used for this purpose, which are placed in the first upstream third of the conditioning compartment and preferably are submerged at least a third of the height of the glass.

This results in an operating flexibility and a very improved quickness of response: 90% of the effect to be obtained by a given "signal," change of composition in particular, is obtained in about ten hours instead of 8 to 10 days in a traditional furnace.

The effectiveness of the fining cell is not notably affected by the increase of scale between the devices of examples 1 and 2, because by use of the heating, characteristic of the invention, of the glass traveling through the fining hopper, a reduction of the number of bubbles by a factor of at least 100 is obtained.

We claim:

1. A device for continuously producing fined glass, comprising:
   a melt chamber having means for melting a vitrifiable charge;
   a fining chamber in the form of a vertically extending chute;
   a throat connecting a bottom of said melting chamber with a bottom of said fining chamber, whereby molten material from said melting chamber is delivered to said bottom of said fining chamber;
   discharge means for discharging said molten material from the upper portion of said chute, whereby said molten material flows upward through said fining chamber; and
   heating means distributed throughout the length of said chute of said fining chamber for homogeneously heating said upwardly flowing molten material in said chute by at least 100° C. to a fining temperature.

2. The device of claim 1 wherein said heating means comprise a vertically spaced array of horizontally extending electrodes.

3. A process for continuously producing fined glass, comprising the steps of:
   melting a vitrified charge in a melting chamber to form a molten mass;
   delivering said molten mass via a throat from a bottom of said melting chamber to a bottom of a fining chamber in the form of a vertically extending chute;
   flowing said molten mass upward in said fining chamber, due to hydrostatic pressure; and
   using heating means distributed throughout the length of said chute to homogeneously heat said upwardly flowing molten mass in said fining chamber by at least 100° C. to a fining temperature.

4. Device according to claim 2, wherein said heating means include at least one horizontal heating element close to an outlet of said throat in said melting chamber.

5. Device according to claim 4, wherein said heating means comprise at least one heating element in the vicinity of a wall of the chute opposite said discharging means, the dissipated power and the distance from said wall of said at least one heating element being such that a current descending along said wall becomes negligible.

6. Device according to claim 2, wherein said chute has the shape of an upwardly flared hopper, further comprising a plane downstream wall having an upper portion inclined downstream, a slope of said downstream wall being between 50° and 80°.

7. Device according to claim 6, wherein said hopper has a rectangular section with approximately vertical sidewalls extending parallel to the plane of symmetry of said fining chamber, and an approximately vertical upstream wall orthoganal to said plane of symmetry.

8. Device according to claim 2, wherein said heating means comprise electrodes submerged in said molten material, whereby said molten material is heated by direct Joule effect.

9. Device according to claim 8, wherein said electrodes extend horizontally, an active part thereof preferably extending from one sidewall to the other of the chute.

10. Device according to claim 8, wherein said electrodes comprise horizontal electrodes entering said tank through a downstream wall thereof.

11. Device according to claim 8, including vertical electrodes going through the bottom of said chute.

12. Device according to claim 2, wherein the throat has an outlet section less than the section of the lower part of the chute, said lower part section being at least equal to 30% of the section of said upper portion of said chute.

13. Device according to claim 12, wherein the height of the chute is at least equal to the square root of the area of said upper portion.

14. Device according to claim 13, including a conditioning compartment connected to said discharge means, wherein the section area for material flow in a channel of the conditioning compartment is at least 20% greater than the section area for material flow at said discharge means.

15. Device according to claim 14, wherein said channel has an average depth between 0.4 and 0.8 m and a length at least equal to three times a width thereof.

16. Device according to claim 15, wherein said channel has a bottom with an ascending slope from upstream to downstream, and means for maintaining the depth of said material at each end between 0.4 and 0.8 m.

17. Device according to claim 16, wherein said channel has an average depth of 0.6 m.

18. Device according to claim 17, wherein the channel includes an evacuation orifice with a section between 30 and 50% of the section of a downstream end of said channel.

19. Device according to claim 2, wherein said discharge means includes a refractory sill at a connection between the chute and a conditioning compartment, said sill reducing a passage section of the material by 20 to 60% with respect to a maximum section in the conditioning compartment.

20. Device according to claim 2, including a screen partitioning an atmosphere between the fining compartment and a conditioning compartment connected thereto.

21. Device according to claim 8 including burners in the fining compartment.

22. Device according to claim 8, wherein the burners are placed in a conditioning compartment connected to said discharging means.

23. Device according to claim 2 including agitators in an upstream half of a conditioning compartment connected to said discharging means.

24. Device according to claim 2, wherein the melting chamber comprises an electrically heated tank, of the cupola type, operating under a continuous layer of vitrifiable mixture.

25. Device according to claim 24, wherein the tank of the melting chamber includes a removal orifice in a bottom thereof.

26. The process of claim 3 wherein said heating step includes the step of using a vertically spaced array of horizontally extending electrodes.

27. Process according to claim 26, wherein said vitrifiable charge contains a fining agent, wherein said heating step heats said charge from a level below a decomposition temperature of the fining agent to a level at which said fining agent exhibits a very notable decomposition rate.

28. Process according to claim 27, wherein said heating step is carried out continuously and gradually during said upward flow step.

29. Process according to claim 28, wherein the heating step is initiated in a median horizontal zone of fining chamber.

30. Process according to claim 29, including the step of discharging, via a surface current, said molten mass from the fining chamber to a conditioning chamber in which molten mass is homogenized in a recirculation belt and cooled to a temperature favorable to shaping.

31. Process according to claim 30, wherein the heating step is performed by direct Joule effect between electrodes immersed in said molten mass.

32. Process according to claim 31, wherein said molten mass in said upward flow step has a lesser ascending speed in a higher part of said fining chamber than in a lower part thereof.

33. Process according to claim 30, wherein the speed of the flow of material at a horizontal connection between the fining chamber and the conditioning chamber is greater than the speed of said upward flow in the fining chamber, and moreover greater than the speed of the flow of said surface current.

34. Process according to claim 30, including the steps of isolating the atmosphere of the fining chamber from that of the conditioning chamber, and putting said fining and conditioning chambers under excess pressure in relation to the outside atmosphere.

35. Process according to claim 30, wherein a lower current of said recirculation belt, exhibits an average volume of 0.5 to 3 times the volume of material draw removed from said conditioning chamber.

36. Process according to claim 26, wherein said melting step comprises electric melting under a continuous layer of vitrifiable mixture, said delivering step being performed in the lower part of the melting chamber.

37. Process according to claim 36, wherein, for making of industrial silica-soda-lime glasses, containing 68 to 74% $SiO_2$, 0 to 3% $Al_2O_3$, 12 to 15% $Na_2O$, 8 to 12% CaO, the vitrifiable charge contains sulfate in an amount corresponding to at least 0.1% $SO_3$, and the heating of the molten mass during its travel through the fining chamber preferably covers at least the temperature range between 1370° and 1480° C., a cooling of the molten mass optionally being performed during its transfer between the melting chamber and fining chamber.

38. Process according to claim 37 wherein said glasses include components with very strong vapor tensions.

* * * * *